Dec. 14, 1965  J. F. SWIFT  3,223,191
FINAL DRIVE FOR CRAWLER TYPE TRACTOR
Filed June 14, 1962  4 Sheets-Sheet 1
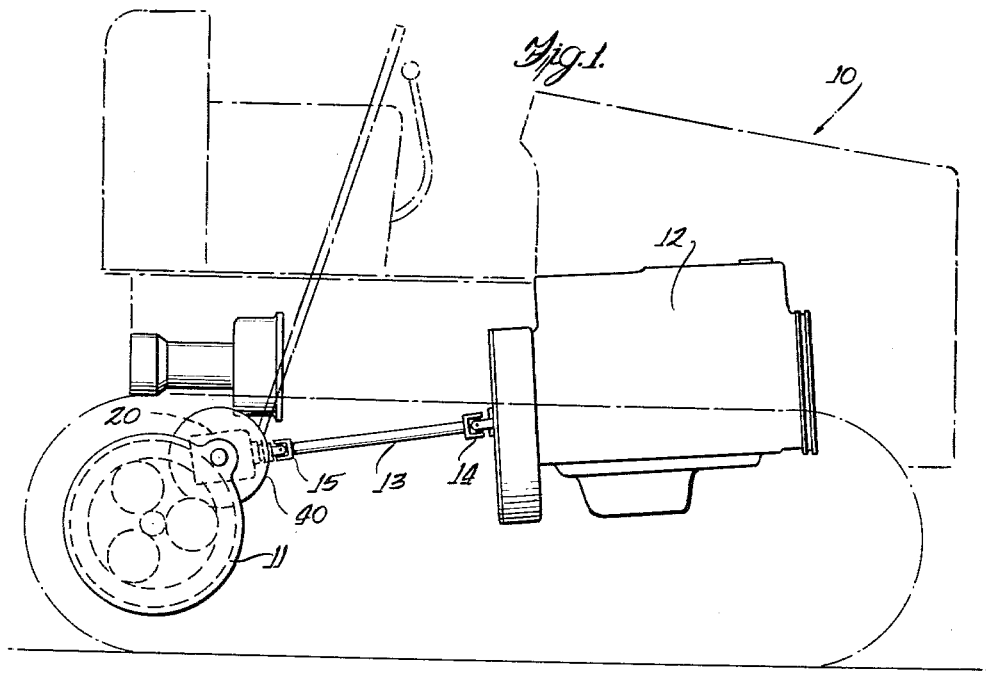
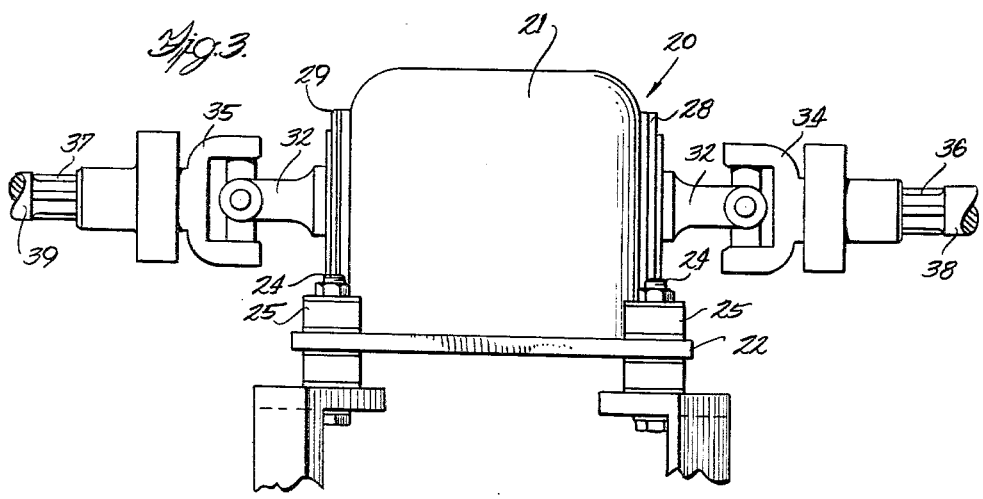
Inventor
John F. Swift
Paul O. Pippel
Attorney

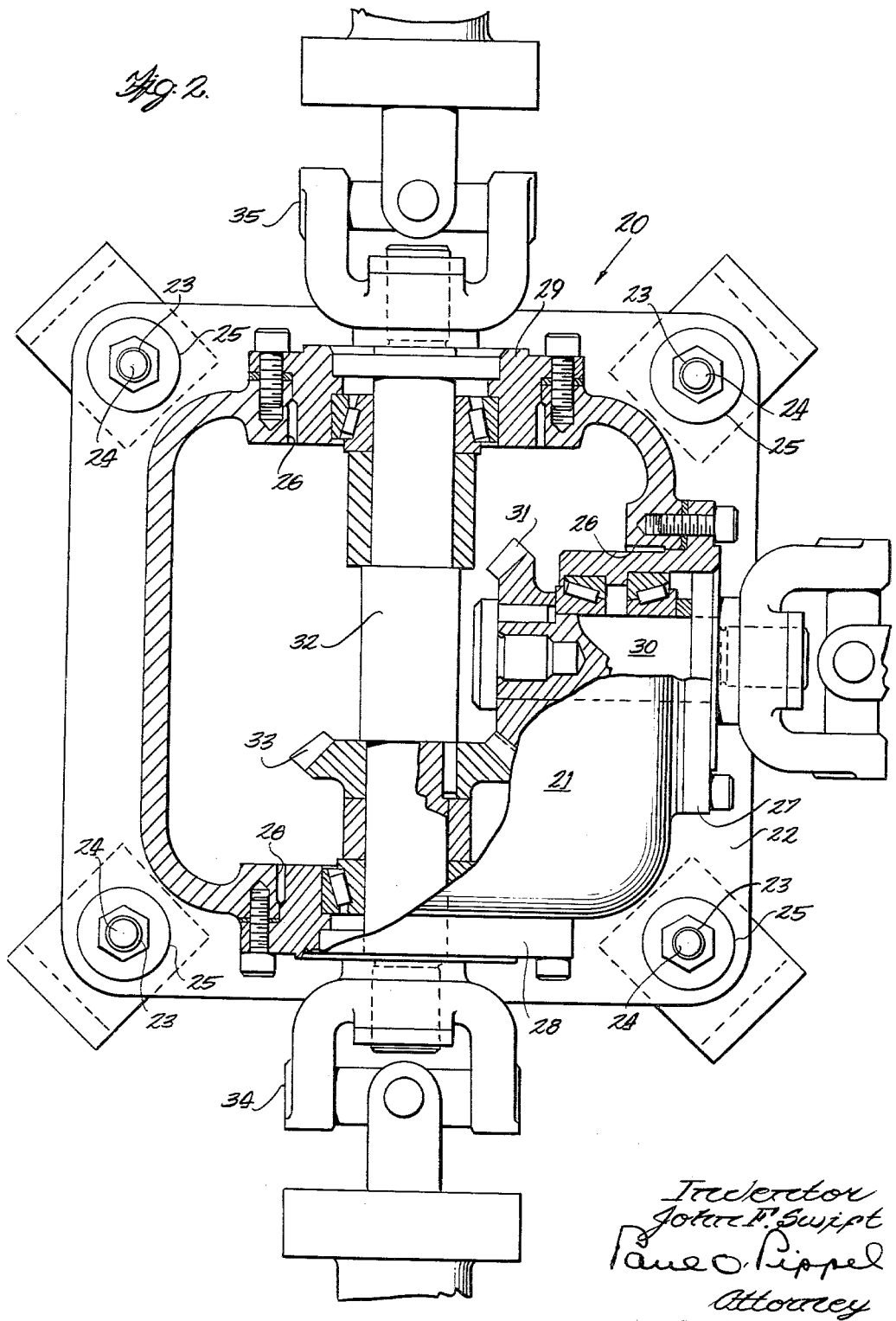

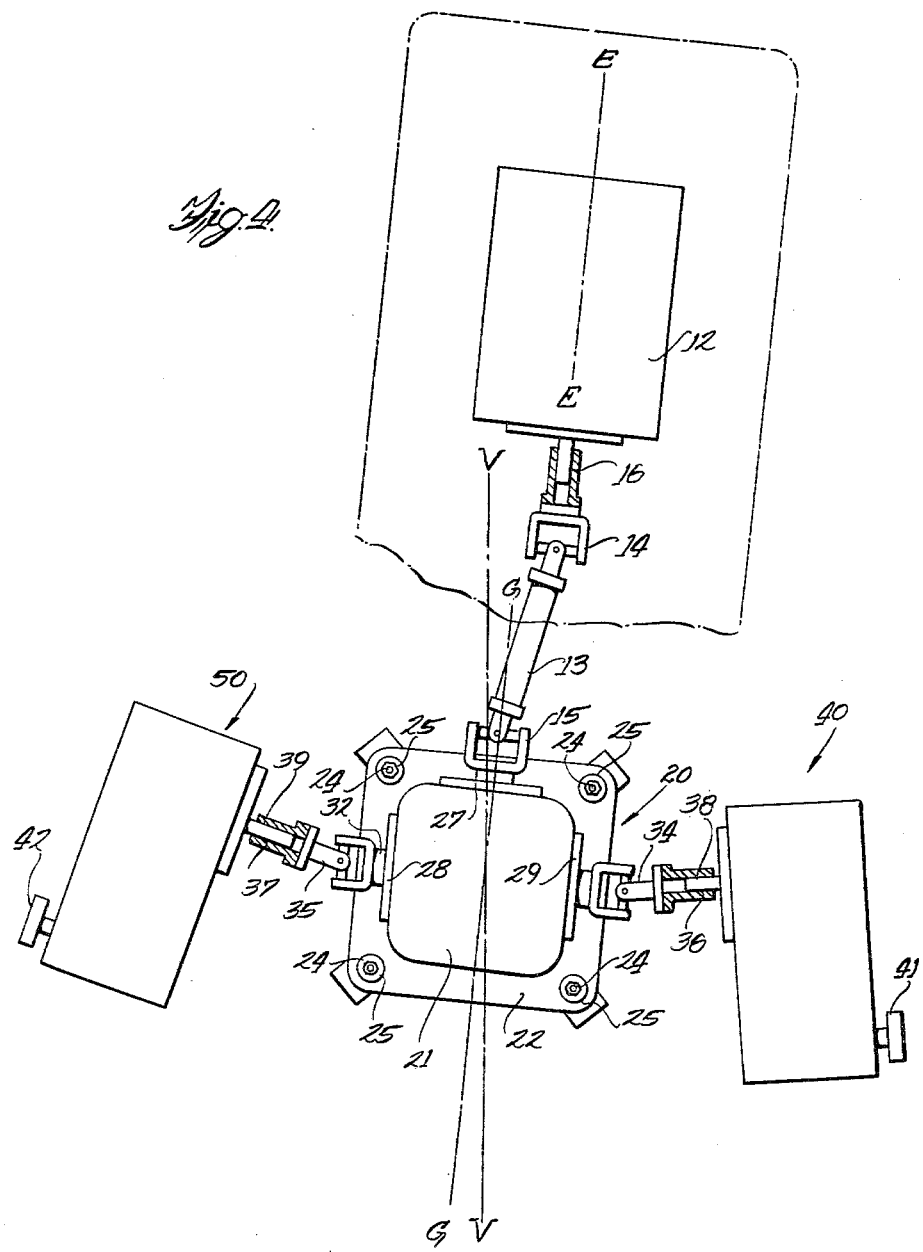

Dec. 14, 1965    J. F. SWIFT    3,223,191
FINAL DRIVE FOR CRAWLER TYPE TRACTOR
Filed June 14, 1962    4 Sheets-Sheet 4

3,223,191
FINAL DRIVE FOR CRAWLER TYPE TRACTOR
John Frederick Swift, Chicago, Ill., assignor to International Harvester Company, Chicago, Ill., a corporation of New Jersey
Filed June 14, 1962, Ser. No. 202,418
9 Claims. (Cl. 180—6.48)

The present invention relates to drive arrangements for vehicles, and more particularly to a final drive for a track-laying vehicle.

In the conventional construction of crawler-type tractors, a large cast iron housing encasing the differential and the rear axles is used. A housing such as this is especially designed for the specific tractor upon which it is to be used. It is, therefore, an expensive part of the tractor. Also, the internal parts for the housing are generally custom made and, therefore, entail considerable expense. When using a housing such as this, if any of the parts within the housing fail, often the entire housing must be dropped and a major repair job is required.

When utilizing a housing such as this, difficulties are encountered in mounting the housing on the frame of the tractor. The housing is secured to the parallel longitudinal tractor frame members and must be accurately located such that it is normal to the longitudinal axis of the tractor. This requires precise alignment of the frame members with each other and of the housing with the frame members. Therefore, the frame of a crawler tractor and its housing fittings must be accurately constructed and their alignment must be maintained while the tractor is in use. However, this is difficult because of the deflections which occur in the vehicle due to the large forces normally encountered in operation.

In a conventional crawler tractor the steering and braking is accomplished by a brake or clutch which is provided for each of the track-driving members. The speed of the tractor is regulated by a transmission, and a throttle which controls the engine speed. Coordinating the action of these various control means requires a considerable amount of skill and experience on the part of the operator and the manueverability of a power tractor, even when operated by a skilled driver, is considerably limited.

The generally purpose of this invention is to provide a final drive for crawler-type tractors which embraces all the advantages of similarly employed drive systems and possesses none of the aforedescribed disadvantages. To attain this, the present invention contemplates a unique arrangement of a floating gearbox in combination with a pair of hydromechanical transmissions whereby the steering, braking and speed of the tractor is controlled by the hydromechanical transmissions, and whereby the drive system is constructed of components which have utility other than in this specific drive system, and whereby the drive system is less expensive, less subject to undesirable deflections and distortions, and is easier to service than that used in a conventional crawler tractor.

An object of the present invention is the provision of a final drive for a crawler-type tractor whereby the steering, braking, and speed of the tractor is controlled by a single set of controls.

Another object is to provide a crawler-type tractor with a drive system wherein the speed of either track can be infinitely varied from zero to the maximum.

A further object of the invention is the provision of a final drive for a crawler-type tractor wherein the tractor motor can be operated at a constant speed regardless of the desired speed of the tractor.

Still another object is to provide a final drive for a crawler-type tractor that can adjust itself to accommodate for misalignment of the tractor frame due either to manufacturing or operation.

These and other objects of the invention will become more apparent from the specification and drawings, wherein:

FIGURE 1 shows the drive system mounted on a tractor which is shown in phantom lines;

FIGURE 2 illustrates a bottom view of the floating gearbox partly in section;

FIGURE 3 shows a front view of the floating gearbox and the transmission input drive shafts;

FIGURE 4 is a bottom view of the drive system showing the engine and transmissions located at exaggerated angles;

Figure 5:
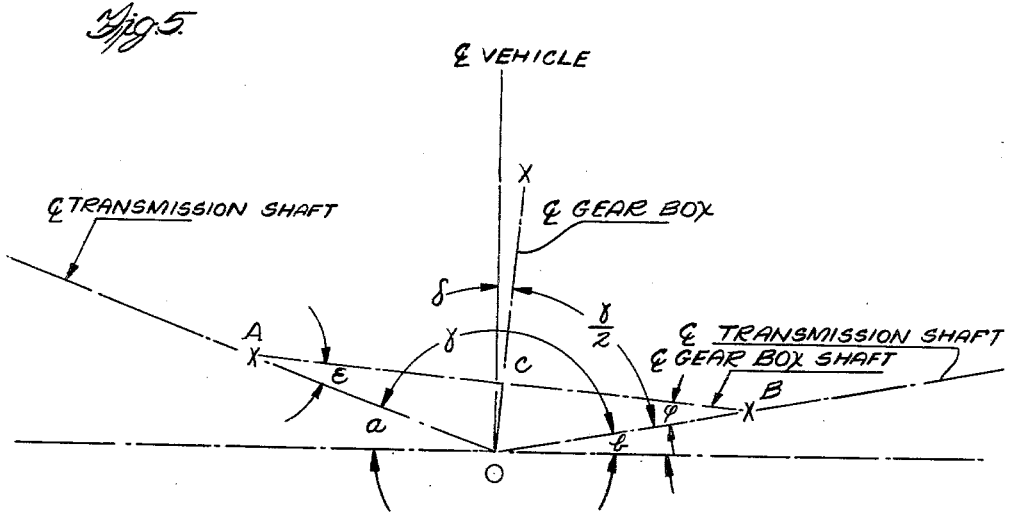
FIGURE 5 is a schematic view showing the geometrical relationship between the angles of both transmission shafts and the angle of the gearbox shaft.

Referring now to the drawings, wherein like reference characters designate like or corresponding parts throughout the several views, there is shown in FIGURE 1 a crawler-type tractor generally designated 10 including track-laying means 11 and an engine 12 mounted thereon. The final drive system for the crawler-type tractor, which is the subject matter of this application, broadly includes a drive shaft 13 having a front universal joint 14 and a rear universal joint 15, a floating gearbox 20, and a right hand hydromechanical transmission 40 and a left hand hydromechanical transmission 50. This final drive system not only transmits power from the engine 12 to the track-laying means 11 but also functions as the steering, braking and speed control mechanism for the tractor.

The inter-relationships between the vehicle, the engine, the floating gearbox, and the hydromechanical transmissions is best illustrated in FIGURE 4. In this figure, the line VV represents the center line of the vehicle, the line EE represents the center line of the engine, and the line GG represents the center line of the gearbox. The engine, the floating gearbox, and the hydromechanical transmissions have in this figure been illustrated at exaggerated angles to the center line of the vehicle for the purpose of explaining how this drive system can accommodate for misalignment. The floating gearbox 20 is resiliently mounted upon the frame of the crawler-type tractor, by stud bolts 24 and rubber mounts 25, at a point midway between the track-laying means 11 of the tractor. Because of its resilient mounting, the floating gearbox can be twisted or tilted with respect to the frame of the tractor. Rotary motion is transmitted from the engine to the floating gearbox by the drive shaft 13, which is secured to the output shaft of the engine by sliding splines 16 and includes a pair of universal joints 14 and 15. A drive shaft 30 is journaled in the floating gearbox by a bearing-carrying plate 27 and the solid output shaft 32 of the floating gearbox is journaled by a pair of bearing-carrying plates 28 and 29. The opposite ends of the solid shaft 32 are provided with a right universal joint 34 and a left universal joint 35 which are connected to the input shaft of the right hydromechanical transmission and the input shaft 39 of the left hydromechanical transmission by right sliding splines 36 and left sliding splines 37, respectively. The output shafts 41 and 42 of the right and left hydromechanical transmissions are provided with driving means for engagement with the track-laying means 11.

Referring now to FIGURE 2 for a more detailed description of the floating gearbox, which includes a housing 21, a mounting flange 22 having a plurality of apertures 23 therein through which the stud bolts 24 extend to resiliently mount the floating gearbox on the frame of the tractor. The housing 21 has three openings 26 formed therein, two of which are aligned and the third being located 90° from the aligned pair. Each of the openings is provided with a bearing-carrying plate designated by reference numerals 27, 28, and 29. A solid shaft 32 is journaled in the bearing-carrying plates 29 and 28 of the aligned openings and a bevel gear 33 is secured to said solid shaft 32 internally of the floating gearbox housing. A continuation 30 of the drive shaft 13 is journaled in the third bearing-carrying plate 27 and has a bevel gear 31 secured thereto in meshing engagement with the bevel gear 33 of solid shaft 32. In FIGURE 3, the connection between the floating gearbox 20 and the input shafts 38 and 39 of the hydromechanical transmissions 40 and 50 is illustrated. Since this connection is identical on both sides only the connection between the right hand hydromechanical transmissions 40 and the floating gearbox 20 will be explained. A universal joint 34 including sliding splines 36 connect the outwardly extending end of shaft 32 to the input shaft 38 of the hydromechanical transmission.

The transmissions to be used in the drive system are the type commonly referred to as hydromechanical transmissions that combine features of both hydrostatic and mechanical transmissions. For a detailed disclosure of hydromechanical transmissions, reference may be had to U.S. Patent 2,569,562, Douglas Fitch Froebe. The speed ratio of hydromechanical transmissions can be infinitely varied from zero to their operating maximum, and therefore with a constant input speed a hydromechanical transmission can deliver any desired output speed up to its maximum. In using this type of transmission the engine can be set at a constant power output and the drive ratio can be varied solely through the hydromechanical transmission, thus utilizing all the available power at the chosen setting. If the most economical operation is desired, the engine can be operated at its optimum fuel consumption or the engine could be operated at the particular speed demanded by the operation. By using a hydromechanical transmission, the need for mechanical clutch and the frictional braking system is eliminated as the transmission system provides a means of power braking the driving wheels. Braking with this system is regenerative, not dissipative, and efficiently transfers energy from one track to the other in turning operations.

In mounting the components of this drive system, such as the engine and pair of transmissions, on the frame of the vehicle, precise alignment can be disregarded since a considerable amount of misalignment will have no adverse effects upon the drive system.

In FIGURE 5 the geometrical relationship between the angles of both transmission shafts and the angle of the gearbox shaft has been illustrated. The following, which refers to FIGURE 5, is a geometrical proof that regardless of what angle the transmissions are mounted with respect to a line normal to the vehicle center line, the angles between the right hand input transmission shaft and the gearbox shaft will be equal to the angle between the left hand input transmission shaft and the gearbox shaft and, therefore, the angular velocity ratio in these two joints will always be equal. It is also shown that the angle between the input transmission shaft and the gearbox shaft is equal to one-half the sum of the angles alpha and beta, as shown in FIGURE 5.

Angles A and B represent the angles in the universal joints between the transmission shafts and the gearbox shafts.

Angles alpha ($\alpha$) and beta ($\beta$) are the angles at which the transmissions are mounted with respect to the line normal to the center line of the vehicle.

Angle gamma ($\gamma$) represents the angle between the transmission shafts.

Angle delta ($\delta$) represents the angle between the vehicle center line and the gearbox center line.

Angle epsilon ($\epsilon$) represents the supplementary angle to angle A.

Angle phi ($\phi$) represents the supplementary angle to angle B.

$$\sphericalangle AOB = \gamma = 180° - (\alpha + \beta)$$

$$\sphericalangle OCA = \sphericalangle OCB = 90°$$

$$\sphericalangle AOC = \sphericalangle BOC = \frac{\gamma}{2}$$

$$\therefore \epsilon = \phi$$

---

$$AC = CB$$

$$\triangle ACO \equiv \triangle BCO$$

$$\epsilon = 180° - 90° - \frac{\gamma}{2}$$

$$\frac{\gamma}{2} = 90° - \frac{\alpha + \beta}{2}$$

$$\epsilon = 180° - 90° - 90° + \frac{\alpha + \beta}{2}$$

$$\epsilon = \frac{\alpha + \beta}{2}$$

---

$$\delta = 90° - \frac{\gamma}{2} - \beta$$

$$\delta = 90° - 90° + \frac{\alpha + \beta}{2} - \beta$$

$$\delta = \frac{\alpha - \beta}{2}$$

---

When rotary motion is transmitted from one shaft to the second shaft that is at an angle to the first shaft through a universal joint the velocity of the two shafts are not equal. In other words, if the drive shaft is rotating at a constant velocity the velocity of the driven shaft will fluctuate during a single revolution. In a drive system such as this it would, of course, be undesirable if this difference were to become excessive. The angular velocity ratio of the driven shaft to the drive shaft is expressed by the following equation:

$$\frac{\text{Velocity of Driven}}{\text{Velocity of Drive}} = \frac{\cos Z}{1 - \sin^2 \theta \sin^2 Z}$$

in which theta ($\theta$) represents the angle through which the driven shaft has turned and zeta (Z) represents the angle between the shafts.

Figure 6:
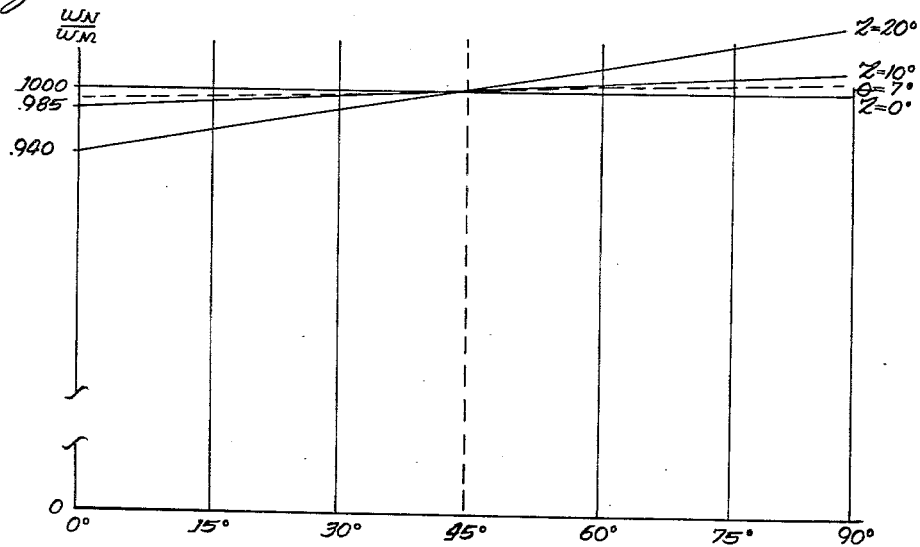
FIGURE 6 is a graph showing the angular velocity ratios for the universal joints between the floating gearbox and the transmissions.

In FIGURE 6 the angular velocity ratio of shafts at angles of 0°, 7°, 10°, and 20° connected by universal joints have been graphically represented over 90° of revolution. The ordinate of this graph represents the ratio of the velocity of the driven shaft to the velocity of the drive shaft and is represented in FIGURE 6 by $Wn/Wm$. It is obvious from this graph that the velocity ratio of the shafts does not vary greatly from unity for angles between the shafts of less than 20°.

It was shown above that the angles epsilon and phi are equal to one-half of the sum of the angles alpha and beta and it has been graphically shown in FIGURE 6 that the angles epsilon and phi can be as much as 20° without critically affecting the velocity ratio between the transmission shaft and the gearbox shaft. This clearly shows that the transmissions can be mounted on the tractor frame with little regard to their alignment and a considerable large misalignment will have no serious undesirable effect upon the operation of the drive system.

In operating a tractor, incorporating the drive system of the present invention, separate controls for each transmission would be available to the operator. The speed and direction of each of the tracks could be thereby independently controlled. Also, one or both of the tracks can be brought to a braking condition by properly manipulating these levers. Since the hydromechanical transmissions provide infinitely variable speed ratios, the speed of each of the tracks can be precisely controlled and the tractor can be smoothly manipulated. Thus, it is seen that a final drive for a crawler-type tractor has been provided in which the steering, speed and braking of the tractor are all controlled by the driving system and the driving system is made up of parts that have other utility and need not be specially made for the particular tractor.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. In a crawler tractor of the type having track laying means on each side thereof, the improvement therein which comprises: a final drive for said track laying means including; a gearbox between said track laying means; a hydromechanical transmission for each track laying means, having an input and an output shaft, in which the input power is split into a hydraulic power path and a mechanical power path, said power paths being combined forming the output power of said transmissions, said hydromechanical transmissions permitting the transmission of power simultaneously over both paths wherein infinitely variable speed ratios are available and alternately transmission of power solely through the mechanical power path when the input and output shafts rotate in the same direction and at equal speeds; motion transmitting means for conveying rotary motion from said gearbox to said input shafts of said hydromechanical transmissions; and motion transmitting means connecting each of said output shafts to one of said track laying means.

2. A track laying vehicle comprising: a frame; an engine mounted on said frame; a floating gearbox, having an output shaft, resiliently mounted on said frame; a drive shaft connecting said engine to said floating gearbox; a pair of hydromechanical transmissions in which the input power is split into a hydraulic power path and a mechanical power path, said power paths being combined forming the output power of said transmissions, said hydromechanical transmissions permitting the transmission of power simultaneously over both paths wherein infinitely variable speed ratios are available and alternately transmission of power solely through the mechanical power path when the input and output rotation is in the same direction and at equal speeds; motion transmitting means including universal joints connecting the output shaft of said floating gearbox to each hydromechanical transmission; and a pair of track laying means, each driven by one of said hydromechanical transmissions.

3. In a final drive system for a crawler type tractor comprising a floating gearbox adapted to be resiliently mounted on the tractor, said gearbox including an output shaft the end portions of which extend outwardly of the gearbox, a pair of hydromechanical transmissions, having input and output shafts, in which the input power is split into a hydraulic power path and a mechanical power path, said power paths being combined forming the output power of said transmissions, said hydromechanical transmissions permitting the transmission of power simultaneously over both paths wherein infinitely variable speed ratios are available and alternately transmission of power solely through the mechanical power path when the input and output shafts rotate in the same direction and at equal speeds, each end portion of said gearbox output shaft being connected to the input shaft of one of said hydromechanical transmissions by a universal joint, and the output shafts of said hydromechanical transmissions being adapted to drive the track laying means of said crawler tractor.

4. In a final drive system for a vehicle comprising: a gearbox adapted to be resiliently mounted on the vehicle frame, said gearbox including a driven shaft extending outwardly therefrom; a hydromechanical transmission, having an input shaft, adapted to be mounted on the vehicle frame, in which the input power is split into a hydraulic power path and a mechanical power path, said power paths being combined forming the output power of said transmission, said hydromechanical transmission permitting the transmission of power simultaneously over both power paths wherein infinitely variable speed ratios are available and alternately transmission of power solely through the mechanical power path when the input and output rotation is in the same direction and at equal speeds; said gearbox and said hydromechanical transmission being mounted with respect to each other such that the driven shaft and the input shaft would intersect; and a universal joint connecting said driven shaft to said input shaft; the resilient mounting of said gearbox and the universal connection between the shafts permitting considerable misalignment of the gearbox and hydromechanical transmission without a corresponding variance in the velocity ratio of the shafts.

5. The invention as set forth in claim 4 wherein said universal joint is connected to said input shaft by sliding splines.

6. In a final drive system for a vehicle comprising: a gearbox adapted to be resiliently mounted on the vehicle frame, said gearbox including a driven shaft having end portions extending outwardly therefrom; a pair of hydromechanical transmissions, each having an input shaft, adapted to be mounted on the vehicle frame, in which the input power is split into a hydraulic power path and a mechanical power path, said power paths being combined forming the output power of said transmission, said hydromechanical transmissions permitting the transmission of power simultaneously over both paths wherein infinitely variable speed ratios are available and alternately transmission of power solely through the mechanical power paths when the input and output rotation is in the same direction and at equal speeds; said gearbox and said hydromechanical transmissions being mounted with respect to each other, such that the driven shaft of said gearbox and said input shafts would intersect; and universal joints connecting each end portion of the driven shaft to one of said input shafts; the resilient mounting of said gearbox and the universal connection between the shafts permitting considerable misalignment of the gearbox and hydromechanical transmissions without a corresponding variance in the velocity ratio of the shafts.

7. The invention as set forth in claim 6 wherein said universal joints are connected to said input shafts by sliding splines.

8. A vehicle including a frame in a final drive system comprising: a gearbox resiliently mounted on said frame, said gearbox including a driven shaft having end portions extending outwardly therefrom; a pair of hydromechanical transmissions, each having an input shaft, mounted on said frame, in which the input power is split into a hydraulic power path and a mechanical power path, said power paths being combined forming the output power of said transmissions, said hydromechanical transmissions permitting the transmission of power simultaneously over both paths wherein infinitely variable speed ratios are available and alternately transmission of power solely through the mechanical power path when the input and output rotation is in the same direction and at equal speeds; said gearbox and said hydromechanical transmissions being mounted with respect to each other such that the driven shaft of said gearbox and the input shafts intersect; and universal joints connecting each end portion of the driven shaft to one of said input shafts; the resilient mounting of said gearbox and the universal connection between the shafts permitting considerable misalignment of the gearbox and hydromechanical transmissions without a corresponding variance in the velocity ratio of the shafts.

9. The invention as set forth in claim 8 wherein said universal joints are connected to said input shafts by sliding splines.

References Cited by the Examiner
UNITED STATES PATENTS

| | | | |
|---|---|---|---|
| 664,478 | 12/1900 | Hopewell | 180—73 X |
| 2,036,437 | 4/1936 | Ruediger | 180—6.7 X |
| 2,053,869 | 9/1936 | Haltenberger | 180—73 |
| 2,352,483 | 6/1944 | Jandasek | 180—6.44 |
| 2,360,234 | 10/1944 | Jandasek | 180—6.48 |
| 2,406,230 | 8/1946 | Lill | 180—9.62 |
| 2,417,214 | 3/1947 | Roos | 180—73 |
| 2,569,562 | 10/1951 | Froebe | 60—53 |
| 2,714,826 | 8/1955 | Jasper | 180—6.66 |
| 2,811,372 | 10/1957 | Parker et al. | 180—73 |
| 2,967,578 | 1/1961 | Schomers | 180—6.7 |

A. HARRY LEVY, *Primary Examiner.*

BENJAMIN HERSH, *Examiner.*